(12) United States Patent
Jeong

(10) Patent No.: US 11,598,127 B2
(45) Date of Patent: Mar. 7, 2023

(54) VEHICLE BODY ASSEMBLY STRUCTURE

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 22 days.

(21) Appl. No.: 17/056,567

(22) PCT Filed: Jul. 24, 2020

(86) PCT No.: PCT/KR2020/009749
§ 371 (c)(1),
(2) Date: Nov. 18, 2020

(87) PCT Pub. No.: WO2022/014765
PCT Pub. Date: Jan. 20, 2022

(65) Prior Publication Data
US 2022/0010598 A1    Jan. 13, 2022

(30) Foreign Application Priority Data
Jul. 13, 2020    (KR) .......................... 10-2020-0086151

(51) Int. Cl.
*E05B 79/06*    (2014.01)

(52) U.S. Cl.
CPC .................................... *E05B 79/06* (2013.01)

(58) Field of Classification Search
CPC ........ E05B 79/06; E05B 85/107; E05B 85/16; F16B 5/02
See application file for complete search history.

(56) References Cited

U.S. PATENT DOCUMENTS

| | | | |
|---|---|---|---|
| 8,337,132 B2* | 12/2012 | Steffenfauseweh | ... F16B 5/0233 411/546 |
| 8,752,257 B2* | 6/2014 | Van Laak | ............. F16B 43/001 29/458 |
| 9,150,145 B2 | 10/2015 | Wandelt | |
| 10,746,212 B2* | 8/2020 | Burger | .................... F16B 21/02 |
| 2005/0074276 A1 | 4/2005 | Luetze et al. | |
| 2005/0270790 A1 | 12/2005 | Kreutzberg | |
| 2007/0009342 A1 | 1/2007 | Figge et al. | |

(Continued)

FOREIGN PATENT DOCUMENTS

| | | |
|---|---|---|
| KR | 20-1998-0042188 U | 9/1998 |
| KR | 10-1187022 B1 | 9/2012 |
| KR | 10-2019-0073542 | 6/2019 |

OTHER PUBLICATIONS

International Searching Authority/KR, International Search Report and Written Opinion of the International Searching Authority, Application No. PCT/KR2020/009749, dated Mar. 18, 2021, 9 pages (with English translation of the International Search Report).

(Continued)

*Primary Examiner* — Kristina R Fulton
*Assistant Examiner* — Thomas L Neubauer
(74) *Attorney, Agent, or Firm* — Sunstein LLP

(57) ABSTRACT

The present invention relates to a vehicle body assembly structure allowing a distance between a vehicle body and a part to be adjusted in any of left-right, front-rear, and up-down directions with a simple structure such as a screw.

3 Claims, 12 Drawing Sheets

(56) References Cited

U.S. PATENT DOCUMENTS

| | | | | |
|---|---|---|---|---|
| 2009/0047093 A1* | 2/2009 | Pritchard | ................ | F16B 39/30 |
| | | | | 411/311 |
| 2013/0017014 A1 | 1/2013 | Wandelt | | |
| 2013/0276293 A1* | 10/2013 | Soriano | .................... | F16B 5/02 |
| | | | | 403/230 |
| 2016/0258459 A1* | 9/2016 | Wilkerson | ................ | F16B 5/02 |

OTHER PUBLICATIONS

Korean Intellectual Property Office, Notice of Allowance, Application No. 10-2020-0086151, dated Mar. 10, 2021, 5 pages (in Korean).

Japanese Patent Office, Notice of Reasons for Refusal, Application No. 2020-572494, dated Oct. 18, 2022, 6 pages.

\* cited by examiner

[Fig.1]
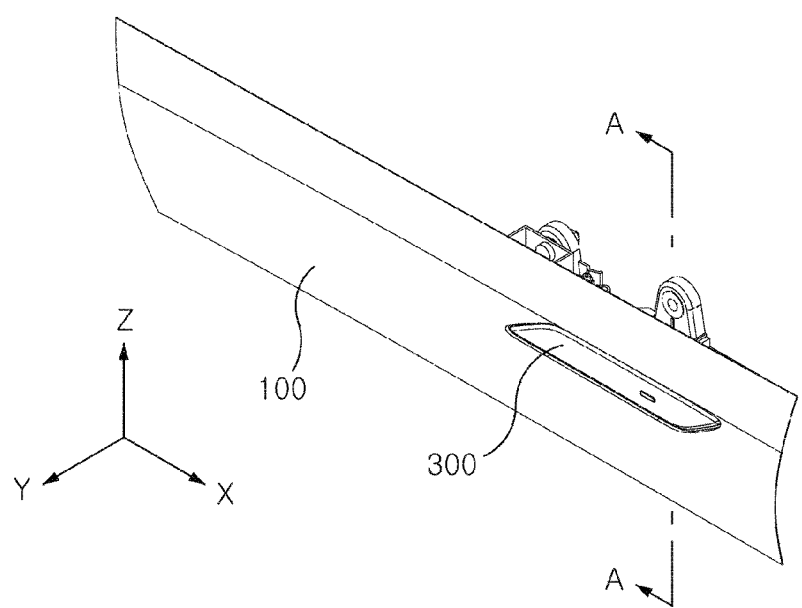

[Fig.2]
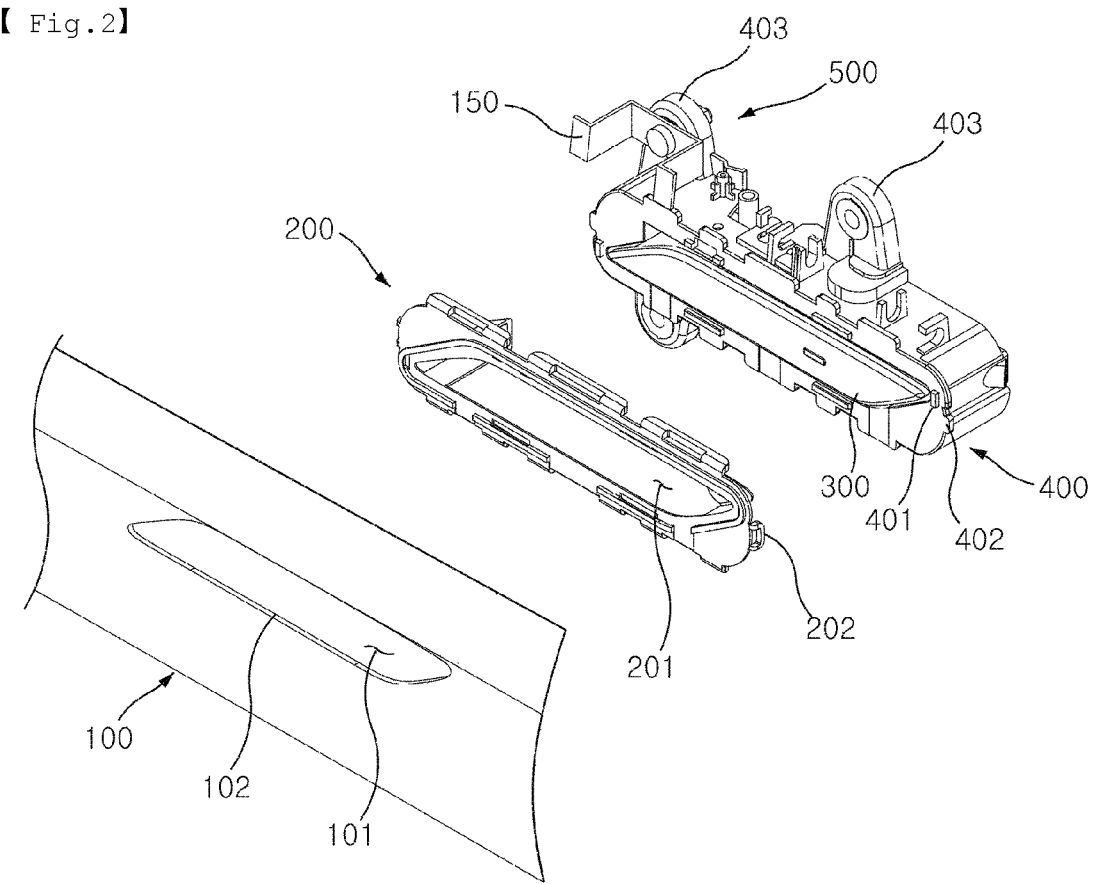

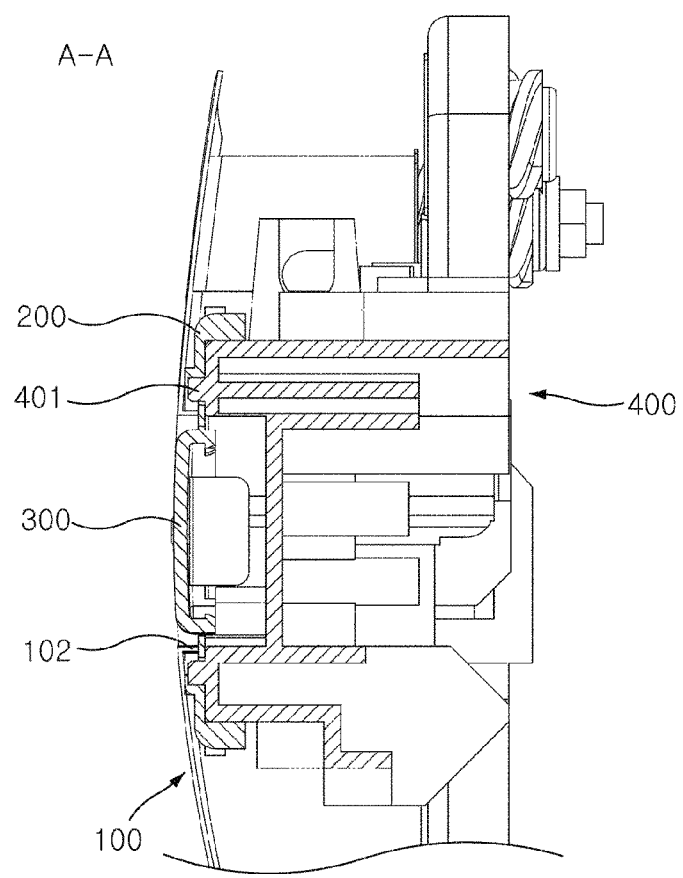
[Fig.3]

【Fig.4】
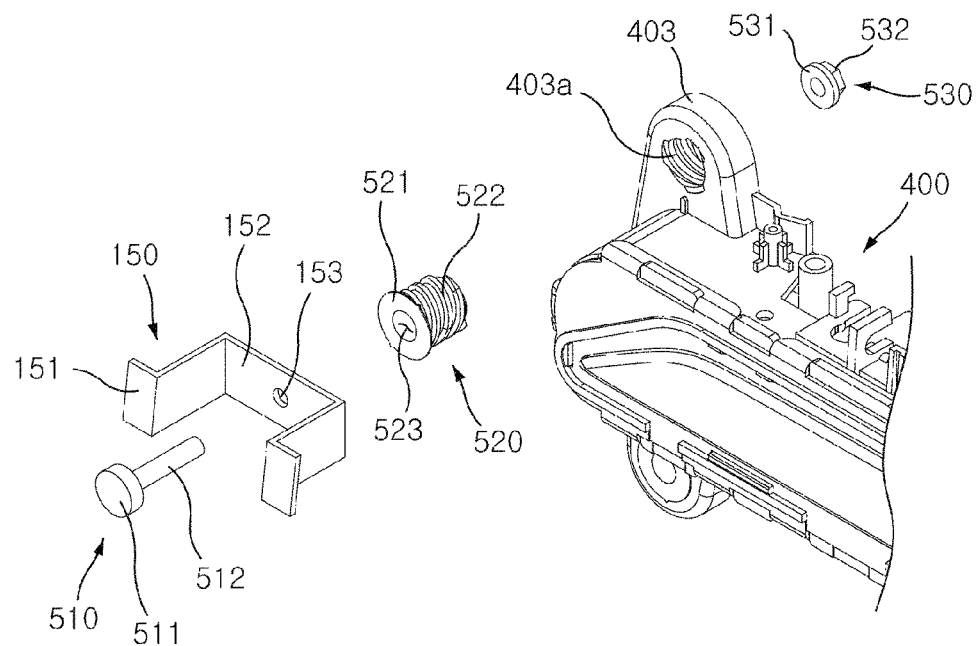
【Fig.5】
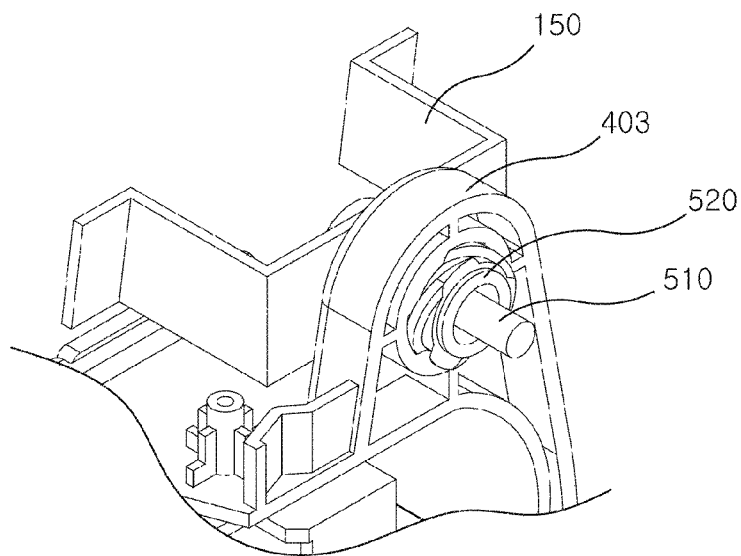

[Fig. 6]
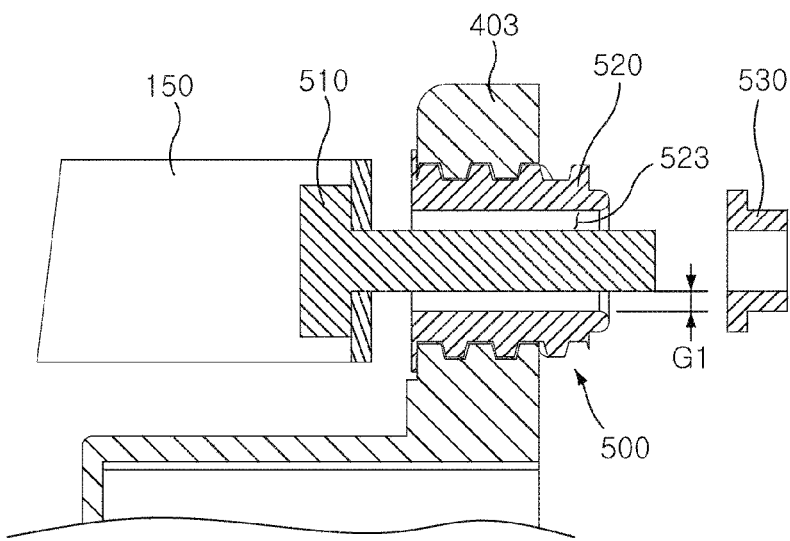
[Fig. 7]
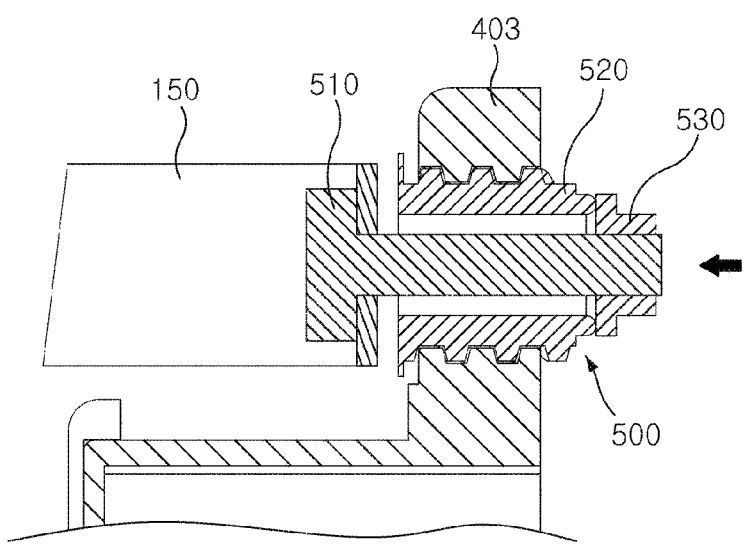

【Fig.8】
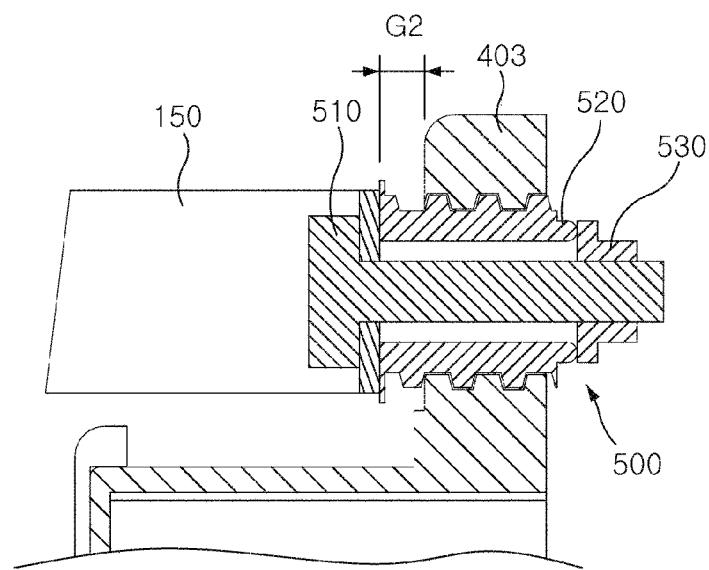
【Fig.9】
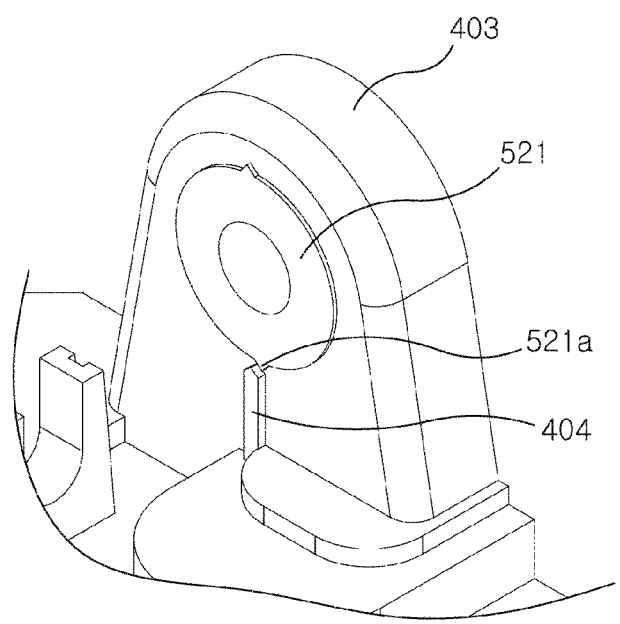

[Fig.10]
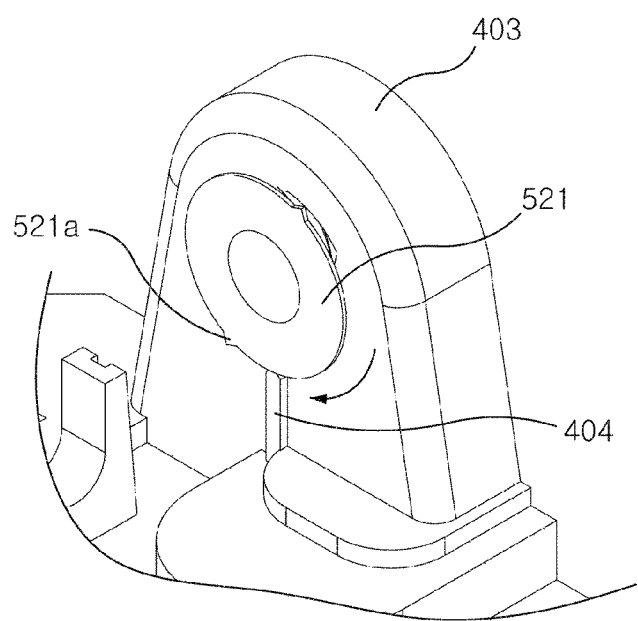

[Fig.11]
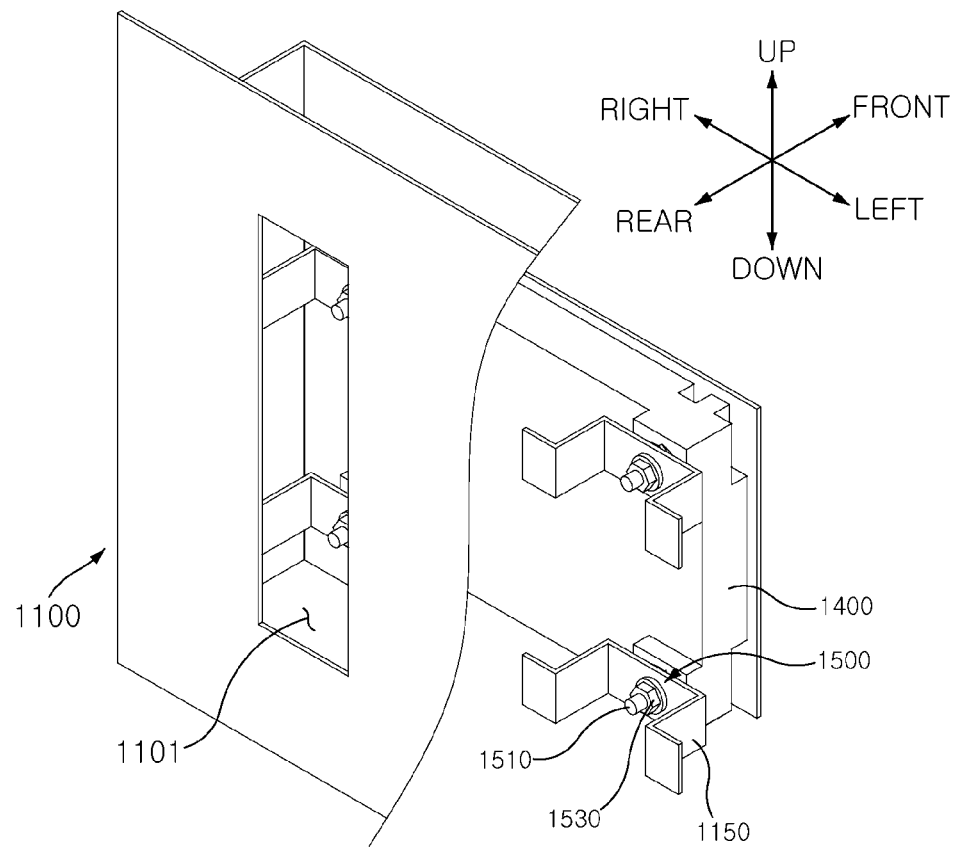

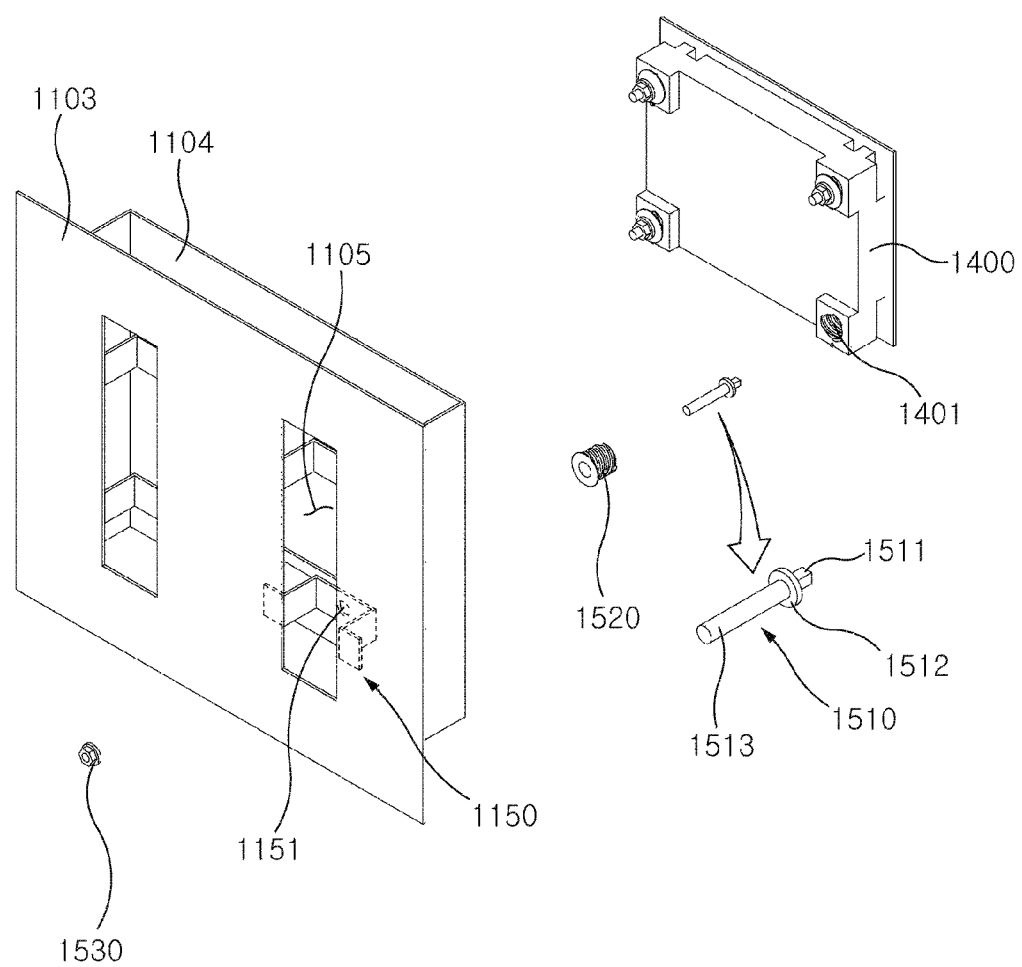
[Fig.12]

[Fig.13]
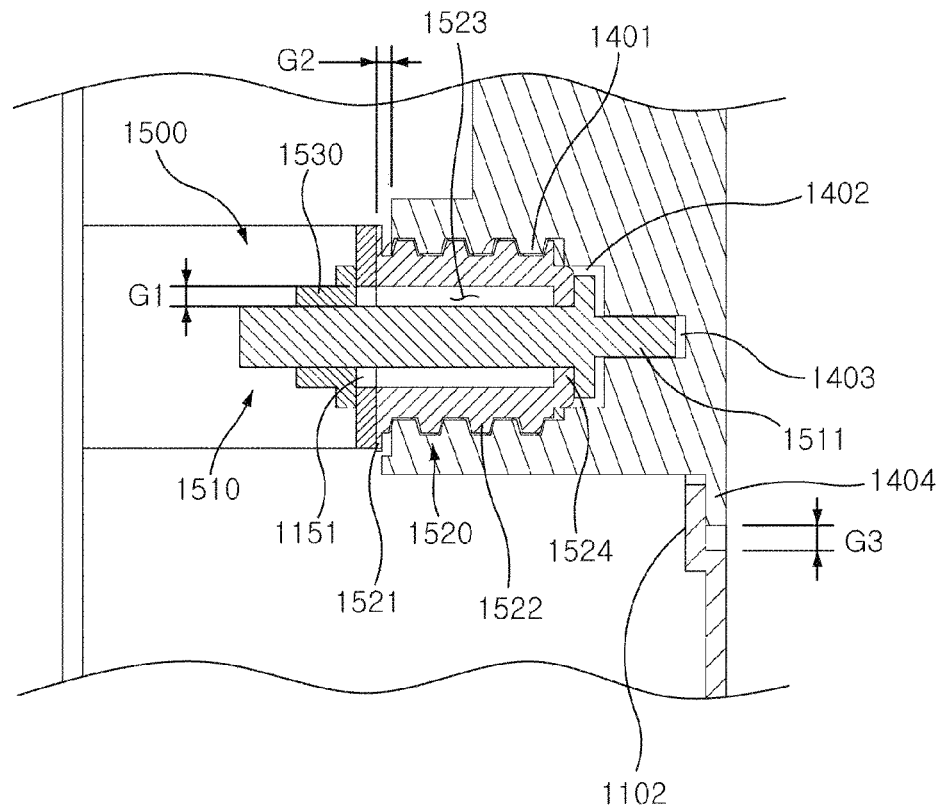
[Fig.14]
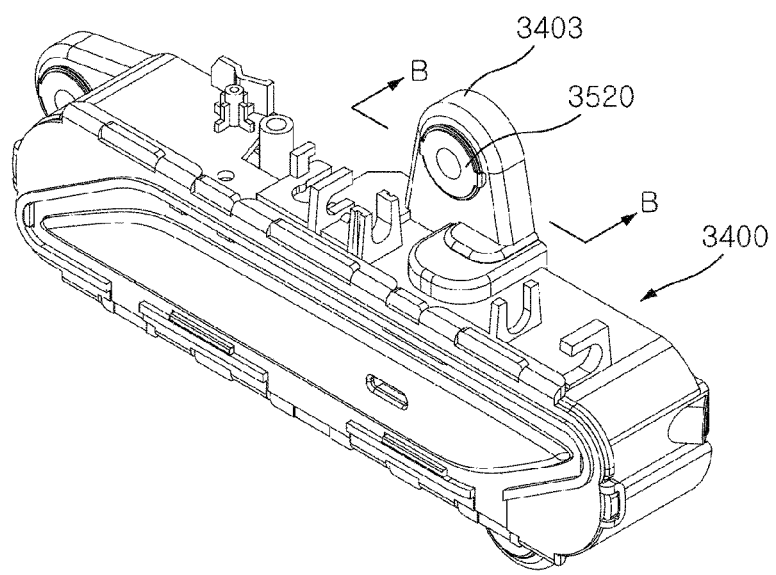

[Fig.15]
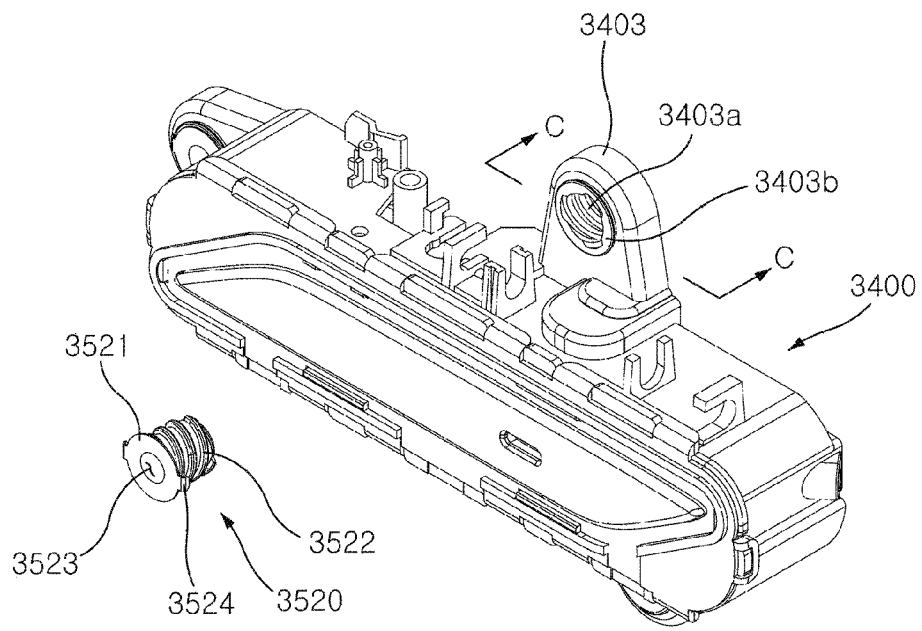
[Fig.16]
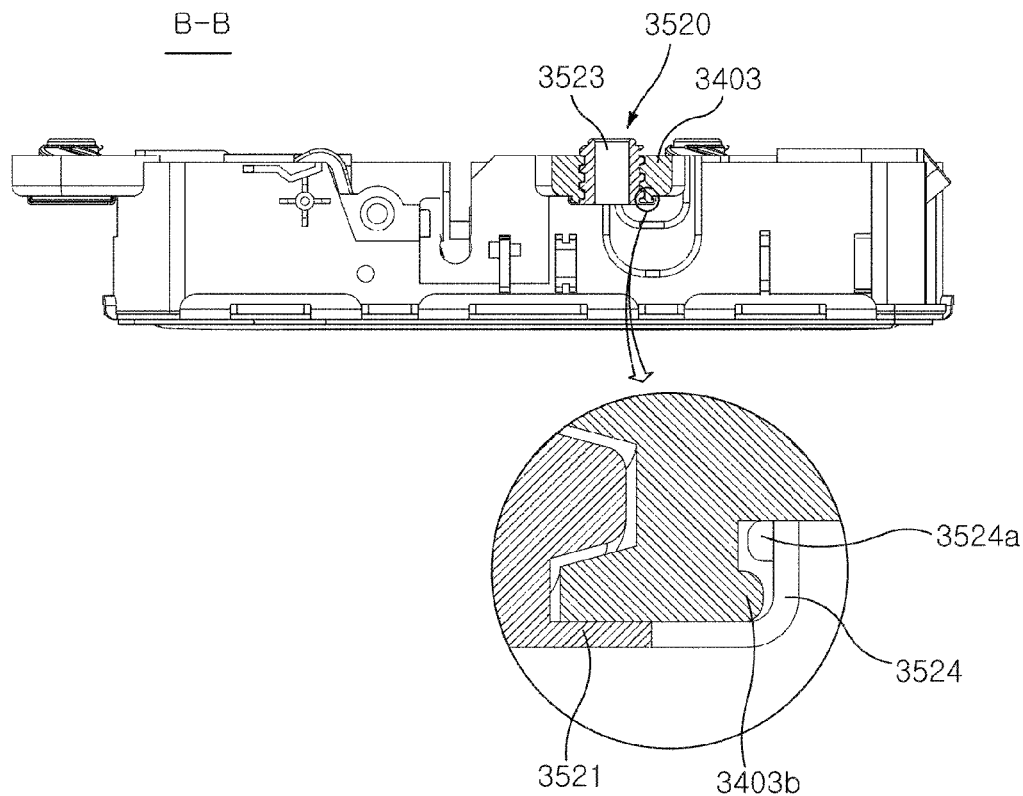

[Fig.17]
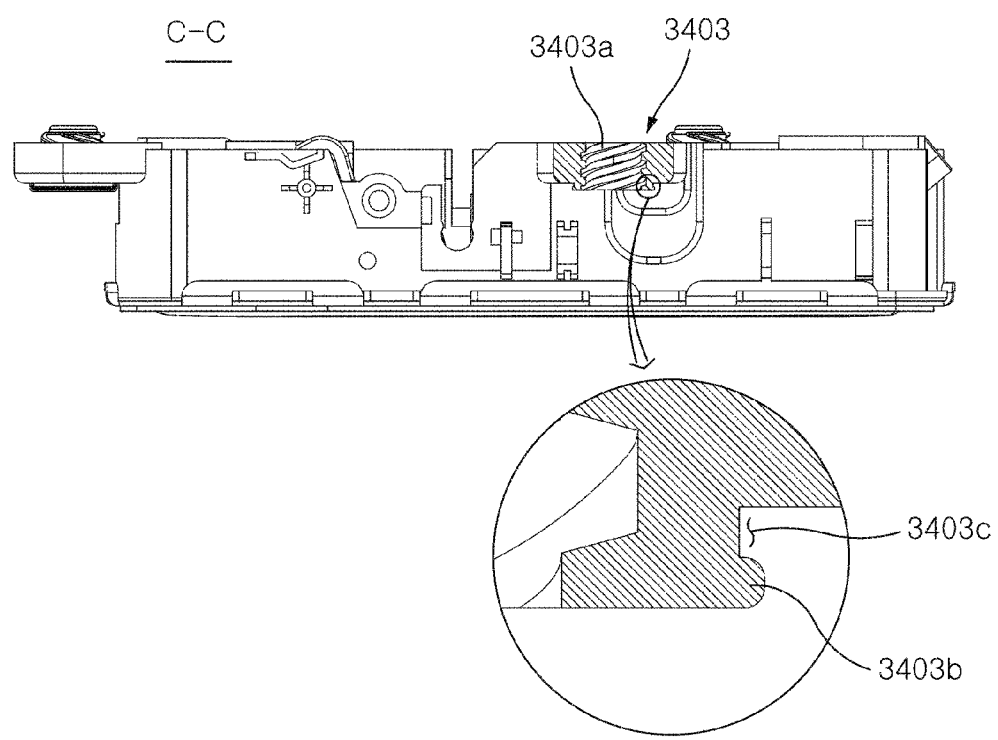

VEHICLE BODY ASSEMBLY STRUCTURE

This application is the national phase entry of international patent application no. PCT/KR2020/009749, filed Jul. 24, 2020 and claims the benefit of Korean patent application No. 10-2020-0086151, filed Jul. 13, 2020, the disclosures of which are incorporated herein by reference in their entirety.

BACKGROUND

Technical Field

The present invention relates to a vehicle body assembly structure, and more particularly, to a vehicle body assembly structure allowing an assembly position that changes due to dimensional tolerance to be adjusted using a screw or hook during assembly of a vehicle body and parts so that a part is placed at a correct position.

Description of Related Art

During assembly of a vehicle body and parts of a vehicle, assembly positions change slightly due to dimensional tolerance of the vehicle body and parts. Thus, particularly in a case in which the assembly is performed through modularization, appropriate tolerance management is needed to place a module at a correct position.

For example, in a case in which a door outer handle made of plastic is assembled to a door frame made of steel, the door frame is subject to variation in each product during press processing, welding, assembly, and the like. Also, the door outer handle is subject to variation in each product due to shrinkage, deformation, dimensional incompatibility, assembly tolerance, and the like.

Due to such variations, when the door outer handle is assembled to the door frame, there are problems in that the distance between the door outer handle and the door frame is different for each position and it is difficult to install the door outer handle at a correct position.

In addition, since unity of the outer skin of the vehicle is not achieved in relation to the exterior design of the vehicle, there is a problem in that the aesthetic quality is adversely affected.

Therefore, there is a need for an assembly structure capable of adjusting the distance between the door outer handle and the door frame so that the variations can be corrected.

An adjustment screw of Korean Unexamined Patent Application Publication No. 10-2019-0073542 includes a spring element for tolerance compensation. The adjustment screw has a problem in that it is difficult for the spring element for tolerance compensation to correct tolerance occurring in directions other than the longitudinal direction of the adjustment screw.

An adjustment element of U.S. Pat. No. 8,337,132 includes a banjo bolt with an outer thread and an inner thread, a component holder coupled to the outer thread, an inner element coupled to the inner thread, and a fixing means fitted to an inner side of the inner element and having a diameter smaller than an inner diameter of the inner element, wherein tolerance in the longitudinal direction of the banjo bolt is adjusted by the banjo bolt and the component holder, and tolerance in a radial direction of the banjo bolt is adjusted by the fixing means. The adjustment element has a problem in that a structure thereof is complex and thus a manufacturing cost increases.

SUMMARY

Technical Problem

The present invention is directed to providing a vehicle body assembly structure allowing a distance between a vehicle body and a part to be adjusted in any of left-right, front-rear, and up-down directions with a simple structure such as a screw or a hook.

Solution to Problem

A vehicle body assembly structure according to the present invention includes a bolt non-rotatably fixed in a vehicle body or a part, a fastening hole formed in the part so that the bolt is inserted thereinto, a bushing inserted between the fastening hole and the bolt, a moving portion configured to move the bushing in one direction of forward and backward with respect to the fastening hole, and a nut fastened to the bolt, wherein an inner side surface of the bushing is spaced apart from the bolt, and wherein the bushing is contacted on and fixed to the vehicle body, when the bushing moves in the one direction due to fastening between the bolt and the nut.

The moving portion may include a female screw portion formed in the fastening hole and threads formed at an outer side surface of the bushing so as to be fastened to the female screw portion, and a slope of the threads of the bushing may be greater than a slope of threads of the bolt.

A head of the bolt may be welded to the vehicle body.

A bolt fixing groove in the shape of a quadrangular prism may be formed in the part, the head of the bolt may be formed in the shape of a quadrangular prism, and rotation of the head of the bolt may be blocked by the bolt fixing groove.

A loosening-prevention catching protrusion may be formed to protrude from a circumference of the bushing, and a fixing hook which is caught at the catching protrusion when the bushing rotates may be formed at the part.

A catching plate may be formed on one surface of the part so as to protrude in a longitudinal direction of the fastening hole, a catching groove may be formed between the one surface of the part and the catching plate so as to be recessed in an inner diameter direction of the catching plate, a loosening-prevention catching bracket may be formed at one surface of the bushing so as to protrude in an outer diameter direction of the bushing, and a catching protrusion inserted into the catching groove may be formed at the catching bracket.

Advantageous Effects

A vehicle body assembly structure according to the present invention has the following advantageous effects.

A distance between a vehicle body and a part can be adjusted with a simple structure through a screw form using a female screw portion and a male screw portion.

The vehicle body assembly structure includes a bolt non-rotatably fixed in a vehicle body or a part, a fastening hole formed in the part so that the bolt is inserted thereinto, a bushing inserted between the fastening hole and the bolt, a moving portion configured to move the bushing in one direction of forward and backward with respect to the fastening hole, and a nut fastened to the bolt. In this way, the bushing is contacted on and fixed to the vehicle body, when the bushing moves in the one direction due to fastening between the bolt and the nut.

When a direction in which the bushing moves is a y-direction, a distance between the vehicle body and the part in the y-direction can be adjusted by the bushing.

Also, an inner side surface of the bushing is spaced apart from the bolt. In this way, a distance between the vehicle body and the part on the x-z plane can be adjusted.

By welding the bolt to the vehicle body, it is possible to prevent rotation of the bolt due to rotation of the nut when the bolt and the nut are being fastened.

A groove in the shape of a quadrangular prism is formed in the part, a head of the bolt is formed in the shape of a quadrangular prism, and the head of the bolt is fitted to the groove. In this way, it is possible to prevent rotation of the bolt due to rotation of the nut when the bolt and the nut are being fastened.

BRIEF DESCRIPTION OF DRAWINGS

FIG. 1 is a front perspective view of a vehicle body assembly structure according to a first exemplary embodiment of the present invention;

FIG. 2 is a front exploded perspective view of the vehicle body assembly structure according to the first exemplary embodiment of the present invention;

FIG. 3 is a cross-sectional view of the vehicle body assembly structure according to the first exemplary embodiment of the present invention;

FIG. 4 is an exploded perspective view of a distance adjustment portion of the vehicle body assembly structure according to the first exemplary embodiment of the present invention;

FIG. 5 is a rear perspective view of a portion of the vehicle body assembly structure according to the first exemplary embodiment of the present invention;

FIG. 6 is a cross-sectional view of a first step in which a bolt is fitted to a bushing in the vehicle body assembly structure according to the first exemplary embodiment of the present invention;

FIG. 7 is a cross-sectional view of a second step in which the bolt is fastened by a nut in the vehicle body assembly structure according to the first exemplary embodiment of the present invention;

FIG. 8 is a cross-sectional view of a third step in which a distance between a vehicle body and a part is adjusted in a front-rear direction in the vehicle body assembly structure according to the first exemplary embodiment of the present invention;

FIG. 9 is a front perspective view of a portion of the vehicle body assembly structure according to the first exemplary embodiment of the present invention that relates to the first step;

FIG. 10 is a front perspective view of a portion of the vehicle body assembly structure according to the first exemplary embodiment of the present invention that relates to the second step;

FIG. 11 is a rear perspective view of a vehicle body assembly structure according to a second exemplary embodiment of the present invention;

FIG. 12 is a rear exploded perspective view of the vehicle body assembly structure according to the second exemplary embodiment of the present invention;

FIG. 13 is a cross-sectional view of the vehicle body assembly structure according to the second exemplary embodiment of the present invention;

FIG. 14 is a perspective view of a vehicle body assembly structure according to a third exemplary embodiment of the present invention;

FIG. 15 is an exploded perspective view of the vehicle body assembly structure according to the third exemplary embodiment of the present invention;

FIG. 16 is a cross-sectional view of the vehicle body assembly structure according to the third exemplary embodiment of the present invention; and FIG. 17 is a cross-sectional view of the vehicle body assembly structure according to the third exemplary embodiment of the present invention (that shows a state in which a bushing is removed).

DETAILED DESCRIPTION OF EMBODIMENTS

Hereinafter, exemplary embodiments of the present invention will be described in detail with reference to the accompanying drawings.

For configurations identical to the related art among the configurations of the present invention which will be described below, reference should be made to the related art described above, and detailed description thereof will be omitted.

When a certain portion is referred to as being "above" another portion, the certain portion may be directly above the other portion or another portion may exist therebetween. In contrast, when a certain portion is referred to as being "directly above" another portion, another portion is not interposed therebetween. Technical terms used herein are only for mentioning specific embodiments and are not intended to limit the present invention. Singular expressions used herein include plural expressions unless the context clearly indicates otherwise.

The term "include" used herein specifies a specific characteristic, region, integer, step, operation, element, and/or component and does not exclude the presence or addition of another specific characteristic, region, integer, step, operation, element, component, and/or group.

Spatially relative terms such as "below" and "above" may be used to facilitate description of the relationship between one portion and another portion illustrated in the drawings. The terms are intended to encompass other meanings or operations of a device in use in addition to their meanings intended in the drawings. For example, when a device in the drawings is flipped upside down, certain portions described as being "below" other portions should be described as being "above" the other portions. Therefore, "below," which is an illustrative term, may encompass both upward and downward directions. The device may rotate by 90° or by other angles, and the spatially relative terms may be interpreted according thereto.

In the exemplary embodiments of the present invention, a front-rear direction refers to a left-right direction (width direction, y-direction) of a vehicle, a left-right direction refers to a front-rear direction (longitudinal direction, x-direction) of the vehicle, and an up-down direction refers to an up-down direction (z-direction) of the vehicle.

Hereinafter, an assembly structure between a vehicle body and a door handle among automobile parts will be described as an example. A vehicle body assembly structure according to the present invention may also be applied when assembling an automobile part other than the door handle, which has a structure similar to the door handle, to the vehicle body.

First Embodiment

As illustrated in FIGS. 1 and 2, a first exemplary embodiment of the present invention relates to a vehicle body assembly structure capable of adjusting a distance between a door frame 100 and a door outer handle during assembly.

The door outer handle includes a housing 400 installed at the door frame 100, a handle portion 300 installed in the housing 400 and withdrawn to the outside of the vehicle or inserted toward the housing 400 through the door frame 100, and a bumper portion 200 installed between the housing 400 and the door frame 100. A housing mounting portion 403 is formed on a left side and a right side of an upper portion of the housing 400 so as to protrude upward. Also, a housing mounting portion 403 is formed on a left side of a lower portion of the housing 400 so as to protrude downward. That is, three housing mounting portions 403 are formed on the housing 400.

A door mounting portion 150 disposed at a position corresponding to the housing mounting portion 403 and coupled to the housing mounting portion 403 is fixed to the rear of the door frame 100. The door mounting portion 150 may be fixed to the door frame 100 by welding.

The housing mounting portion 403 and the door mounting portion 150 are coupled by a distance adjustment portion 500 which will be described below.

As illustrated in FIG. 4, the door mounting portion 150 includes two fixing plates 151 coupled to the door frame 100 and a fastening plate 152 formed to be recessed rearward between the two fixing plates 151.

A bolt installation hole 153 is formed to pass through the center of the fastening plate 152 in the front-rear direction.

As illustrated in FIG. 2, the door frame 100 includes a first handle portion through-hole 101 formed to pass through the door frame 100 in the front-rear direction and an insertion portion 102 formed at a circumference of the first handle portion through-hole 101 to protrude rearward.

The first handle portion through-hole 101 is formed to be spaced a predetermined distance apart from a circumference of the handle portion 300. Thus, the handle portion 300 may pass through the first handle portion through-hole 101.

As illustrated in FIGS. 2 and 3, the bumper portion 200 includes a second handle portion through-hole 201 formed to pass through the bumper portion 200 in the front-rear direction and a plurality of fastening rings 202 formed at a circumference of the bumper portion 200.

The second handle portion through-hole 201 is formed to be spaced a predetermined distance apart from the circumference of the handle portion 300. Thus, the handle portion 300 may pass through the first handle portion through-hole 101 and the second handle portion through-hole 201.

The fastening ring 202 is formed to be bent rearward. A groove to which a fastening protrusion 402 of the housing 400, which will be described below, is fitted is formed in the fastening ring 202.

The bumper portion 200 is formed to protrude inward from the insertion portion 102 and is installed to abut a circumference of the insertion portion 102. Due to the bumper portion 200, a phenomenon in which foreign matter enters the housing 400 through the first handle portion through-hole 101 is prevented when the handle portion 300 is inserted.

As illustrated in FIG. 2, the housing 400 is formed in a rectangular parallelepiped shape as a whole.

A plurality of fastening protrusions 402 are formed at a circumference of a front surface of the housing 400 so as to protrude outward. The bumper portion 200 is coupled to the front of the housing 400 by the fastening rings 202 and the fastening protrusions 402.

A guide protrusion 401 is formed to protrude forward at a total of six sites including both left and right sides above the handle portion 300, both left and right sides below the handle portion 300, and a left side and a right side of the handle portion 300 on the basis of the handle portion 300 from the front surface of the housing 400.

As illustrated in FIG. 3, the guide protrusions 401 are disposed at an outer side of the insertion portion 102 of the door frame 100. Also, a front surface of each guide protrusion 401 is disposed in front of a rear surface of the insertion portion 102. That is, the guide protrusions 401 wrap around the top, bottom, left, and right of the insertion portion 102. Due to the guide protrusions 401, the housing 400 may be located within a specific range about the insertion portion 102 of the door frame 100.

The housing mounting portion 403 includes a fastening hole formed to pass therethrough in the front-rear direction and a fixing hook 404 formed at a lower portion of a female screw portion 403a as illustrated in FIGS. 9 and 10.

The female screw portion 403a is formed in the fastening hole. Threads of the female screw portion 403a may be formed at an angle of 30° or more.

The fixing hook 404 is formed to protrude forward. An upper portion of the fixing hook 404 is formed in a triangular shape. That is, an inclination is formed at a left side and a right side of an upper portion of the fixing hook 404.

The distance adjustment portion 500 is illustrated in detail in FIG. 4.

The distance adjustment portion 500 includes a bushing 520 fastened to the female screw portion 403a of the housing mounting portion 403 and a bolt 510 coupled to a nut 530 through the door mounting portion 150 and the bushing 520.

The bolt 510 includes a bolt head 511 and a screw portion 512 formed to protrude from one surface of the bolt head 511. The bolt 510 is fitted to the bolt installation hole 153 of the door mounting portion 150 from rear to front.

An outer diameter of the bolt head 511 is formed to be larger than an inner diameter of the bolt installation hole 153, and an outer diameter of the screw portion 512 is formed to be smaller than the inner diameter of the bolt installation hole 153. When the bolt 510 is installed in the bolt installation hole 153 from front to rear, the bolt head 511 is caught at the fastening plate 152 and is prevented from falling to the rear. Then, the bolt 510 is welded and fixed to the door mounting portion 150. Thus, when the bolt 510 is fastened using the nut 530, the bolt 510 and the nut 530 are prevented from rotating together. The screw portion 512 may be a standard screw, and threads of the screw portion 512 may be formed at an angle of 5° or less. The fastening plate 152 of the door mounting portion 150 is formed so that the bolt 510 may be recessed rearward sufficiently to the extent that the bolt 510 may be inserted into the bolt installation hole 153 after being placed in a space formed between the rear surface of the door frame 100 and the fastening plate 152.

The bushing 520 includes a first washer portion 521 and a male screw portion 522 formed to the rear of the first washer portion 521 and fastened to the female screw portion 403a of the housing mounting portion 403.

An outer diameter of the first washer portion 521 is formed to be larger than the inner diameter of the female screw portion 403a.

As illustrated in FIGS. 9 and 10, two catching protrusions 521a are further formed on the first washer portion 521.

The catching protrusions 521a are formed along the circumference of the first washer portion 521 so as to be distant from each other.

The catching protrusions 521a are formed to protrude in a radial direction from the circumference of the first washer portion 521. Each catching protrusion 521a is formed in a triangular shape. Here, the catching protrusions 521a protrude sufficiently so that the catching protrusions 521a are caught at the fixing hook 404 when the bushing 520 rotates.

Since the catching protrusions 521a and the upper portion of the fixing hook 404 are all formed in a triangular shape, the catching protrusions 521a may easily fall out of the fixing hook 404 when the bushing 520 is rotated with a sufficient force. In the first exemplary embodiment of the present invention, the male screw portion 522 and the female screw portion 403a are provided as left-handed screws. The male screw portion 522 is loosened when it rotates clockwise and is fastened when it rotates counterclockwise on the basis of the front surface thereof. When the bushing 520 is completely fastened to the housing mounting portion 403 (first step), the catching protrusion 521a is disposed to be placed just to the right of the fixing hook 404.

Thus, the catching protrusion 521a may prevent an occurrence of a phenomenon in which the male screw portion 522 rotates clockwise and loosens. That is, when the bushing 520 is in a state that corresponds to the first step, the position of the bushing 520 may be fixed by the fixing hook 404.

Also, even when vibration occurs during distribution and the bushing 520 rotates in a loosening direction, an occurrence of a phenomenon in which the bushing 520 deviates from an initial position may be prevented. Also, there is an advantage in that it is easy for a worker to recognize the initial position of the bushing 520 during assembly.

In a case in which, unlike the above description, the male screw portion 522 and the female screw portion 403a are right-handed screws, since the male screw portion 522 is loosened when it rotates counterclockwise, the catching protrusion 521a is disposed to be placed just to the left of the fixing hook 404. A distance adjustment hole 523 is formed to pass through the first washer portion 521 and the male screw portion 522 in the front-rear direction.

As illustrated in FIG. 5, an inner diameter of the distance adjustment hole 523 is formed to be larger than the outer diameter of the bolt 510 inserted into the distance adjustment hole 523. Thus, since the bushing 520 may move in an outer diameter direction of the bolt 510 within the distance adjustment hole 523, errors in the left-right direction and up-down direction may be corrected.

The nut 530 includes a second washer portion 531 and a coupling portion 532 coupled to one surface of the second washer portion 531.

An outer diameter of the second washer portion 531 is formed to be larger than an inner diameter of the distance adjustment hole 523 of the bushing 520, and female threads are formed at an inner side of the coupling portion 532 so that the coupling portion 532 may be coupled to the screw portion 512 of the bolt 510. The female threads of the coupling portion 532 may be standard threads and may be formed at an angle of 5° or less. Thus, the nut 530 does not move forward past the bushing 520. Hereinafter, a method of adjusting a distance between the door frame 100 and the housing 400 in the left-right, front-rear, and up-down directions using the distance adjustment portion 500 will be described with reference to FIGS. 6 to 8.

As illustrated in FIG. 6, when the bushing 520 is in the state that corresponds to the first step, the bushing 520 is completely fastened to the housing mounting portion 403 and is placed as far back as possible.

The bolt 510 fixed to the door mounting portion 150, which is fixed to the door frame 100, in the up-down direction and left-right direction is fitted to the distance adjustment hole 523 of the bushing 520.

A first distance G1 is formed between the rear of the bolt 510 and the inner side surface of the distance adjustment hole 523. That is, even when a position at which the housing mounting portion 403 is assembled differs on the basis of the position of the door mounting portion 150 in the up-down direction or left-right direction, if the difference is less than the first distance G1, the position of the housing mounting portion 403 may be adjusted within the first distance G1 and the difference may be corrected.

Then, as illustrated in FIG. 7, the nut 530 is coupled to the rear of the bolt 510. This is referred to as a second step. Due to a difference between angles at which the threads of the nut 530 and the bushing 520 are formed, a pitch of the bushing 520 is formed to be higher than a pitch of the nut 530. Thus, when a force is applied to the bushing 520 in the longitudinal direction of the bushing 520, the bushing 520 rotates along the threads and moves in the longitudinal direction of the bushing 520.

Accordingly, when the nut 530 is rotated so that the front surface of the nut 530 abuts the rear surface of the bushing 520, due to a force generated in a forward direction when the nut 530 rotates, the bushing 520 rotates by itself and moves forward. Here, a distance from the front surface of the bushing 520 to the front surface of the housing mounting portion 403 is referred to as a second distance G2, and tolerance in the front-rear direction may be corrected by adjusting the second distance G2. As illustrated in FIG. 8, when the bushing 520 abuts the door mounting portion 150, the bushing 520 does not move forward further. Then, the nut 530 is tightened to a tightening torque and fixed, and the housing mounting portion 403 fastened to the bushing 520 is also fixed at its final position. This is referred to as a third step.

Regarding the first exemplary embodiment of the present invention, description has been given by dividing the assembly process into three steps to facilitate understanding, but since the entire process is performed almost simultaneously in reality, work efficiency of a worker is significantly improved.

After each housing mounting portion 403 is assembled, the three housing mounting portions 403 prevent the housing 400 from rotating with respect to the bushing 520.

When the bolt 510 is a right-handed screw, the nut 530 is tightened when it rotates clockwise and loosened when it rotates counterclockwise.

In the third step, in a case in which the bushing 520 is a left-handed screw, when the nut 530 is rotated clockwise and tightened, the bushing 520 also rotates a few degrees clockwise due to a frictional force, and the housing mounting portion 403 is further pressed against the door mounting portion 150. That is, an additional load is applied to the door mounting portion 150 due to the bushing 520.

In contrast, in a case in which the bushing 520 is a right-handed screw, when the nut 530 is rotated clockwise and tightened, the bushing 520 rotates counterclockwise and moves in a direction in which the bushing 520 is separated from the door mounting portion 150. The right-handed screw may be useful when coupling parts which should not receive loads.

Second Embodiment

As illustrated in FIG. 11, a second exemplary embodiment of the present invention relates to a vehicle body assembly structure capable of, when a part 1400, which is to be assembled to an inner side of a vehicle body 1100, is being assembled outside the vehicle body 1100, adjusting a distance between the vehicle body 1100 and the part 1400.

Examples of the part 1400 include a headlight, a sunroof, and the like.

As illustrated in FIG. 12, a fastening hole with an open rear portion is formed at a left side and right side of an upper portion of the part 1400 and at a left side and right side of a lower portion of the part 1400.

A female screw portion 1401 is formed in the fastening hole. Threads of the female screw portion 1401 may be formed at an angle of 30° or more.

A vehicle body mounting portion 1150 disposed at a position corresponding to the female screw portion 1401 and coupled to the female screw portion 1401 is fixed to the rear of the part 1400.

The female screw portion 1401 and the vehicle body mounting portion 1150 are coupled by a distance adjustment portion 1500 which will be described below.

As illustrated in FIG. 12, the vehicle body mounting portion 1150 is formed similarly to the door mounting portion 150 according to the first embodiment.

A bolt installation hole 1151 is formed to pass through the center of the vehicle body mounting portion 1150 in the front-rear direction.

An inner diameter of the bolt installation hole 1151 is formed similarly to that of a distance adjustment hole 1523 of a bushing 1520 which will be described below.

As illustrated in FIGS. 11 to 13, the vehicle body 1100 includes a rear surface plate 1103 and a front surface plate 1104 which is disposed in front of the rear surface plate 1103 and extends forward from each of a left side and a right side of the rear surface plate 1103 and then is bent to be connected thereto. A fastening member manipulation groove 1101 is formed to pass through the rear surface plate 1103 in the front-rear direction. The fastening member manipulation groove 1101 is formed so that the rear of the vehicle body mounting portion 1150 is open toward the outside. Thus, a user may manipulate the vehicle body mounting portion 1150 from behind the vehicle body 1100.

A part installation groove 1105 is formed to pass through the front surface plate 1104 in the front-rear direction.

A part holding portion 1102 is formed at a circumference of the part installation groove 1105 so as to be recessed from front to rear. A stepped portion is formed at the circumference of the part installation groove 1105 due to the part installation groove 1105.

As illustrated in FIGS. 11 to 13, the part 1400 is formed in a rectangular parallelepiped shape as a whole.

A bolt insertion groove 1402 is formed in front of the female screw portion 1401 of the part 1400. The bolt insertion groove 1402 is formed in a cylindrical shape, and a second bolt head 1512 of a bolt 1510, which will be described below, is inserted thereinto. An inner diameter of the bolt insertion groove 1402 is formed to be smaller than an inner diameter of the female screw portion 1401, and a male screw portion 1522 of the bushing 1520, which will be described below, is not inserted into the bolt insertion groove 1402.

A bolt fixing groove 1403 is formed in front of the bolt insertion groove 1402. The bolt fixing groove 1403 is formed in the shape of a quadrangular prism, and a first bolt head 1511 of the bolt 1510, which will be described below, is inserted thereinto. The bolt fixing groove 1403 is formed to be sufficiently small to prevent rotation of the first bolt head 1511.

The female screw portion 1401, the bolt insertion groove 1402, and the bolt fixing groove 1403 communicate with one another. A catching protrusion 1404 is formed at a circumference of the front of the part 1400 so as to protrude toward the outside. The catching protrusion 1404 is inserted into the stepped portion formed due to the part holding portion 1102 of the vehicle body 1100. That is, the part holding portion 1102 is placed behind the catching protrusion 1404. Thus, the catching protrusion 1404 is not able to move rearward past the part holding portion 1102.

The distance adjustment portion 1500 is illustrated in detail in FIGS. 11 to 13.

The distance adjustment portion 1500 includes the bushing 1520 fastened to the female screw portion 1401 of the part 1400 and the bolt 1510 coupled to a nut 1530 through the bushing 1520 and the vehicle body mounting portion 1150.

The bolt 1510 includes the first and second bolt heads 1511 and 1512 and a screw portion 1513 formed to protrude from one surface of the second bolt head 1512.

The first bolt head 1511 is formed in the shape of a quadrangular prism. The first bolt head 1511 is inserted into the bolt fixing groove 1403 of the part 1400 and serves to prevent rotation of the bolt 1510.

The second bolt head 1512 is formed to the rear of the first bolt head 1511.

The screw portion 1513 may be a standard screw, and threads of the screw portion 1513 may be formed at an angle of 5° or less. The bushing 1520 includes a first washer portion 1521 and the male screw portion 1522 formed in front of the first washer portion 1521 and fastened to the female screw portion 1401.

An outer diameter of the first washer portion 1521 is formed to be larger than the inner diameter of the female screw portion 1401.

The distance adjustment hole 1523 is formed to pass through the first washer portion 1521 and the male screw portion 1522 in the front-rear direction.

As illustrated in FIG. 13, an inner diameter of the distance adjustment hole 1523 is formed to be larger than an outer diameter of the bolt 1510 inserted into the distance adjustment hole 1523.

Thus, since the bushing 1520 may move in the outer diameter direction of the bolt 1510 within the distance adjustment hole 1523 and the bolt installation hole 1151, errors in the left-right direction and up-down direction may be corrected.

A bolt fixing protrusion 1524 is formed at a circumference of the distance adjustment hole 1523 so as to protrude around the distance adjustment hole 1523.

An outer diameter of the second bolt head 1512 is formed to be larger than an inner diameter of the bolt fixing protrusion 1524, and an outer diameter of the screw portion 1513 is formed to be smaller than the inner diameter of the bolt fixing protrusion 1524. Here, the bolt fixing protrusion 1524 is formed to protrude sufficiently to the extent that the bolt fixing protrusion 1524 prevents the screw portion 1513 from shaking in the up-down direction or left-right direction.

Hereinafter, a method of adjusting a distance between the vehicle body 1100 and the part 1400 in the left-right, front-rear, and up-down directions using the distance adjustment portion 1500 will be described with reference to FIG. 13.

In a state that corresponds to a first step, first, the bolt 1510 is assembled to the front of the bushing 1520, and the screw portion 1513 of the bolt 1510 is inserted into the distance adjustment hole 1523 of the bushing 1520.

Then, the first bolt head 1511 of the bolt 1510 is inserted into the bolt fixing groove 1403 of the part 1400, and the bushing 1520 is completely fastened to the female screw portion 1401 and placed as far forward as possible.

In this state, the screw portion 1513 of the bolt 1510 that passes through the bushing 1520 and protrudes rearward is fitted to the bolt installation hole 1151 of the vehicle body mounting portion 1150 from front to rear.

The front of the bolt 1510 is fixed in the up-down direction and left-right direction due to the bolt fixing groove 1403, and a first distance G1 is formed between the rear of the bolt 1510 and an inner side surface of the bolt installation hole 1151.

That is, even when a position at which the female screw portion 1401 is assembled differs on the basis of the position of the vehicle body mounting portion 1150 in the up-down direction or left-right direction, if the difference is less than the first distance G1, the position of the bolt 1510 may be adjusted within the first distance G1 and the difference may be corrected. Here, a distance between the stepped portion formed due to the part holding portion 1102 of the vehicle body 1100 and the catching protrusion 1404 of the part 1400 is referred to as a third distance G3. The part 1400 may be installed at a desired position only when the third distance G3 is secured by a distance which is as much as the first distance G1 or more.

Then, a step in which the nut 1530 is coupled to the rear of the bolt 1510 is referred to as a second step.

When the nut 1530 is rotated, due to a difference between angles at which the threads of the nut 1530 and the bushing 1520 are formed, a pitch of the nut 1530 is formed to be lower than a pitch of the bushing 1520. Thus, due to a force generated in a rearward direction when the nut 1530 rotates, the bushing 1520 rotates by itself and moves rearward. Here, the bolt 1510 also moves rearward along with the bushing 1520.

As illustrated in FIG. 13, when the bushing 1520 abuts the vehicle body mounting portion 1150, the bushing 1520 does not move rearward further. Then, the nut 1530 is tightened to a tightening torque and fixed, the shapes of the first bolt head 1511 and the bolt fixing groove 1403 prevent the bolt 1510 from running idle, and the female screw portion 1401 fastened to the bushing 1520 is also fixed at its final position. This is referred to as a third step.

Here, a distance from the front surface of the bushing 1520 to the front surface of the part 1400 is referred to as a second distance G2, and tolerance in the front-rear direction may be corrected by adjusting the second distance G2.

Third Embodiment

In a third exemplary embodiment of the present invention, the shapes of the bushing 520 and the housing mounting portion 403 according to the first embodiment are modified.

In the third exemplary embodiment of the present invention, details identical to those described above according to the first embodiment will be omitted.

As illustrated in FIGS. 14 to 17, a housing mounting portion 3403 which protrudes upward and a housing mounting portion 3403 which protrudes downward are formed at a right side of a housing 3400, and a housing mounting portion 3403 which protrudes leftward is formed at a left side of the housing 3400. That is, three housing mounting portions 3403 are formed in the housing 3400.

A bushing 3520 is installed on the housing mounting portion 3403. The housing mounting portion 3403 includes a catching plate 3403b formed to protrude forward and a fastening hole formed to pass through the housing mounting portion 3403 including the catching plate 3403b in the front-rear direction.

The catching plate 3403b is formed in the shape of a disk. As illustrated in FIG. 17, a catching groove 3403c is formed at a circumference of the catching plate 3403b so as to be recessed toward an inner side of the catching plate 3403b.

A catching protrusion 3524a of the bushing 3520, which will be described below, is inserted into the catching groove 3403c. The catching groove 3403c is formed to the rear of the catching plate 3403b.

A corner in front of the catching groove 3403c and the catching plate 3403b is formed to be rounded.

A female screw portion 3403a is formed in the fastening hole. The female screw portion 3403a is formed at the center of the catching plate 3403b.

Threads of the female screw portion 3403a may be formed at an angle of 30° or more.

The bushing 3520 includes a first washer portion 3521 and a male screw portion 3522 formed to the rear of the first washer portion 3521 and fastened to the female screw portion 3403a of the housing mounting portion 3403.

An outer diameter of the first washer portion 3521 is formed to be larger than an inner diameter of the female screw portion 3403a.

Two catching brackets 3524 are further formed on the first washer portion 3521.

The catching brackets 3524 are formed along the circumference of the first washer portion 3521 so as to be distant from each other.

The catching brackets 3524 are formed to protrude in an outer diameter direction of the first washer portion 3521 from a circumference of the first washer portion 3521 and then be bent rearward. That is, the catching bracket 3524 is formed in an L-shape. Here, the catching bracket 3524 protrudes sufficiently in the outer diameter direction of the first washer portion 3521 to the extent that the catching bracket 3524 may wrap around the catching plate 3403b of the housing mounting portion 3403.

As illustrated in FIG. 16 the catching protrusion 3524a is formed at a rear end of the catching bracket 3524 so as to protrude inward.

The catching protrusion 3524a is inserted into the catching groove 3403c of the housing mounting portion 3403.

A corner of the catching protrusion 3524a is formed to be rounded. Since the corner of the catching protrusion 3524a and the corner in front of the catching plate 3403b are formed to be rounded, the catching protrusion 3524a may escape from the catching groove 3403c more easily when the bushing 3520 is rotated by applying sufficient force.

When the bushing 3520 is fastened to the housing mounting portion 3403 so as to be placed as far back as possible, the catching protrusion 3524a is formed to be spaced a predetermined distance apart from the front surface of the catching groove 3403c. When vibration occurs during distribution and the bushing 3520 rotates in a loosening direction and moves forward, the catching protrusion 3524a touches the front surface of the catching groove 3403c. Then, rotation of the bushing 3520 is blocked due to a frictional force which is generated between the catching protrusion 3524a and the front surface of the catching groove 3403c. Thus, an occurrence of a phenomenon in which the bushing 3520 deviates from an initial position may be prevented.

The present invention has been described above with reference to exemplary embodiments thereof, but those of ordinary skill in the art may change or modify the present invention in various ways within the scope not departing from the idea and range of the present invention defined in the claims below.

DESCRIPTION OF SYMBOLS

100: door frame
101: first handle portion through-hole
102: insertion portion
150: door mounting portion
151: fixing plate
152: fastening plate
153: bolt installation hole
200: bumper portion
201: second handle portion through-hole
202: fastening ring
300: handle portion
400: housing
401: guide protrusion
402: fastening protrusion
403: housing mounting portion
403a: female screw portion
404: fixing hook
500: distance adjustment portion
510: bolt
511: bolt head
512: screw portion
520: bushing
521: first washer portion
521a: catching protrusion
522: male screw portion
523: distance adjustment hole
530: nut
531: second washer portion
532: coupling portion
1100: vehicle body
1101: fastening member manipulation groove
1102: part holding portion
1103: rear surface plate
1104: front surface plate
1105: part installation groove
1150: vehicle body mounting portion
1151: bolt installation hole
1400: part
1401: female screw portion
1402: bolt insertion groove
1403: bolt fixing groove
1404: catching protrusion
1500: distance adjustment portion
1510: bolt
1511: first bolt head
1512: second bolt head
1513: screw portion
1520: bushing
1521: first washer portion
1522: male screw portion
1523: distance adjustment hole
1524: bolt fixing protrusion
1530: nut
3400: housing
3403: housing mounting portion
3403a: female screw portion
3403b: catching plate
3403c: catching groove
3520: bushing
3521: first washer portion
3522: male screw portion
3523: distance adjustment hole
3524: catching bracket
3524a: catching protrusion

What is claimed is:

1. A vehicle body assembly structure comprising:
a bolt non-rotatably fixed in a vehicle body or a part;
a fastening hole formed in the part so that the bolt is inserted thereinto;
a bushing inserted between the fastening hole and the bolt;
a moving portion configured to move the bushing in one direction of forward and backward with respect to the fastening hole; and
a nut fastened to the bolt,
wherein an inner side surface of the bushing is spaced apart from the bolt, and
wherein the bushing is contacted on and fixed to the vehicle body, when the bushing moves in the one direction due to fastening between the bolt and the nut,
wherein the moving portion includes a female screw portion formed in the fastening hole and threads formed at an outer side surface of the bushing so as to be fastened to the female screw portion, and a slope of the threads of the bushing is greater than a slope of threads of the bolt,
wherein a catching plate is formed on one surface of the part so as to protrude in a longitudinal direction of the fastening hole,
a catching groove is formed between the one surface of the part and the catching plate so as to be recessed in an inner diameter direction of the catching plate,
a loosening-prevention catching bracket is formed at one surface of the bushing so as to protrude in an outer diameter direction of the bushing, and
a catching protrusion inserted into the catching groove is formed at the catching bracket.

2. The vehicle body assembly structure according to claim 1,
wherein a head of the bolt is welded to the vehicle body.

3. The vehicle body assembly structure according to claim 1,
wherein a loosening-prevention catching protrusion is formed at one surface of the bushing so as to protrude in an outer diameter direction of the bushing, and a fixing hook which is caught at the catching protrusion when the bushing rotates is formed at the part.

* * * * *